(12) United States Patent
Kubota

(10) Patent No.: US 9,582,084 B2
(45) Date of Patent: Feb. 28, 2017

(54) INTERACTIVE PROJECTOR AND INTERACTIVE PROJECTION SYSTEM

(71) Applicant: Seiko Epson Corporation, Tokyo (JP)

(72) Inventor: Shinji Kubota, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/079,008

(22) Filed: Mar. 23, 2016

(65) Prior Publication Data

US 2016/0286190 A1 Sep. 29, 2016

(30) Foreign Application Priority Data

Mar. 27, 2015 (JP) ................. 2015-065630

(51) Int. Cl.
*H04N 9/31* (2006.01)
*G06F 3/0346* (2013.01)
*G06F 3/03* (2006.01)

(52) U.S. Cl.
CPC ........... *G06F 3/0346* (2013.01); *G06F 3/0325* (2013.01); *H04N 9/31* (2013.01)

(58) Field of Classification Search
CPC ............... H04N 9/31; H04N 9/74; G06F 3/03; G06F 3/0346; G06F 3/0325
USPC ......................................... 348/601, 744–745
See application file for complete search history.

(56) References Cited

U.S. PATENT DOCUMENTS

| | | | | |
|---|---|---|---|---|
| 5,757,674 A * | 5/1998 | Marugame | ............ | G06T 7/0042 359/204.1 |
| 6,592,228 B1 * | 7/2003 | Kawashima | ............ | G03B 21/11 348/745 |
| 7,470,029 B2 * | 12/2008 | Kobayashi | ............... | H04N 5/74 348/745 |
| 8,295,587 B2 * | 10/2012 | Aoyama | ................. | G06T 5/006 382/154 |
| 8,478,001 B2 * | 7/2013 | Aoki | ..................... | G06K 9/3216 382/106 |
| 9,355,451 B2 * | 5/2016 | Oi | ......................... | G06T 19/006 |
| 2002/0122117 A1 * | 9/2002 | Nakagawa | ............. | H04N 5/232 348/218.1 |
| 2016/0173842 A1 * | 6/2016 | De La Cruz | ......... | H04N 9/3194 353/70 |

FOREIGN PATENT DOCUMENTS

JP     2012-150636 A     8/2012

* cited by examiner

*Primary Examiner* — Trang U Tran
(74) *Attorney, Agent, or Firm* — ALG Intellectual Property, LLC

(57) ABSTRACT

An interactive projector includes a projection section, a plurality of cameras, and a position detection section for detecting a three-dimensional position of the pointing element based on images captured by the plurality of cameras. Defining a unit vector representing a normal direction of the projected screen as a projected-screen normal vector, a unit vector representing a direction of an optical axis of the first camera as a first optical axis vector, and a unit vector representing a direction of an optical axis of the second camera as a second optical axis vector, the first camera and the second camera are arranged such that an absolute value of an inner product of the second optical axis vector and the projected-screen normal vector is smaller than an absolute value of an inner product of the first optical axis vector and the projected-screen normal vector.

6 Claims, 9 Drawing Sheets

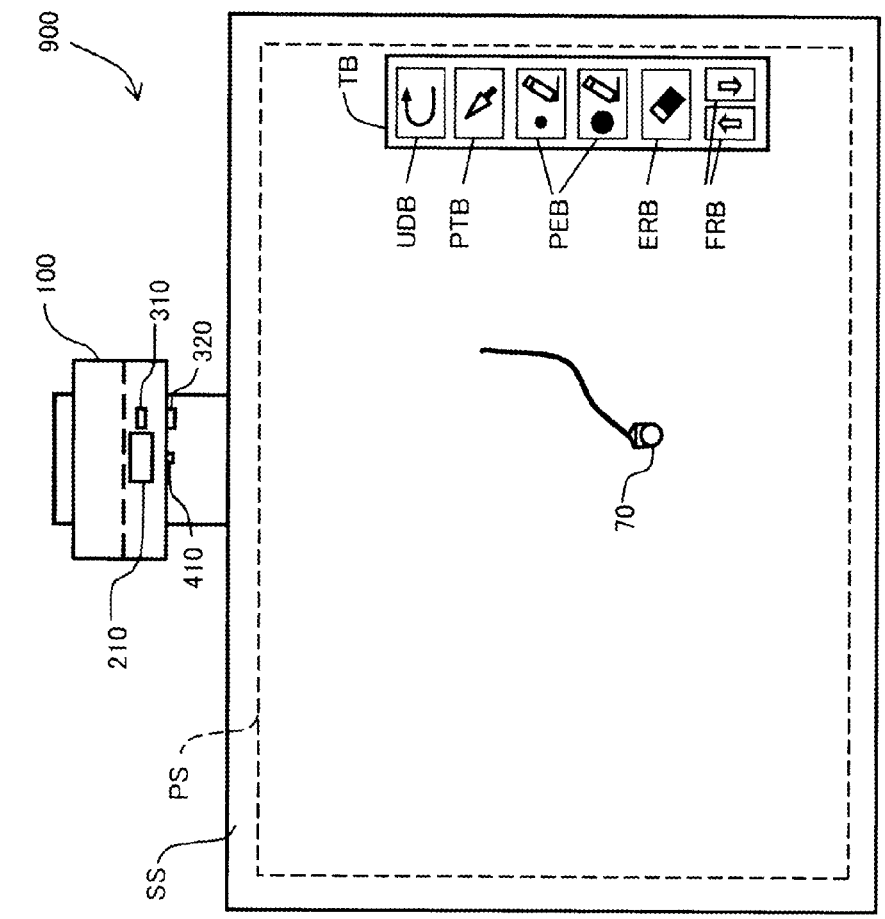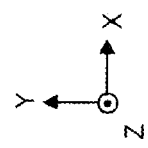
FIG. 2B
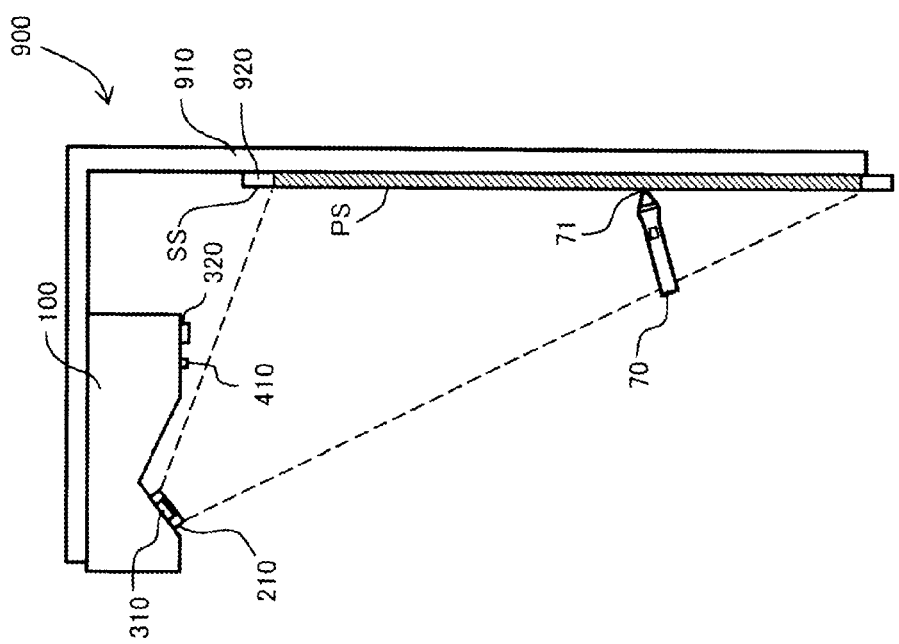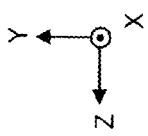
FIG. 2A

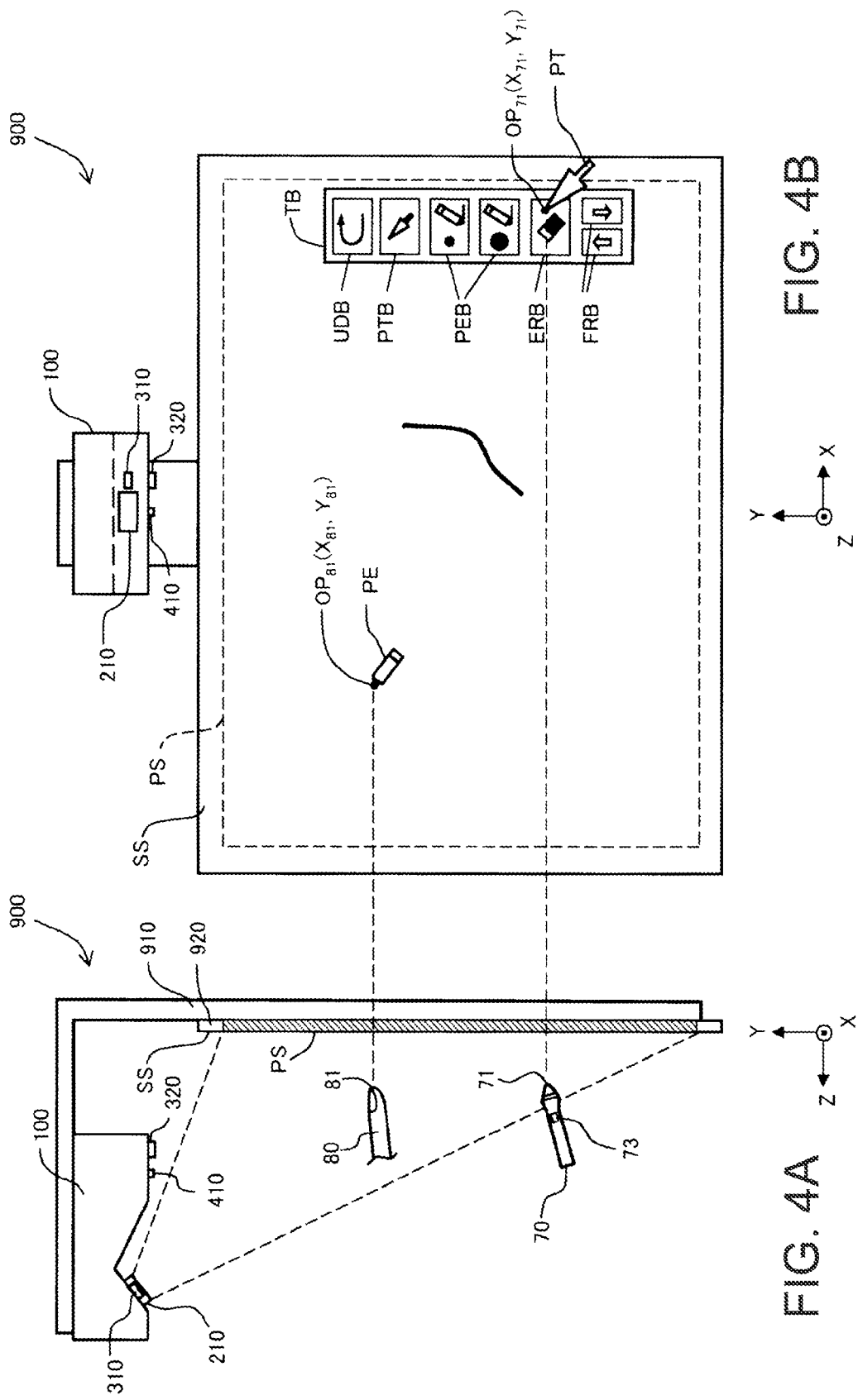

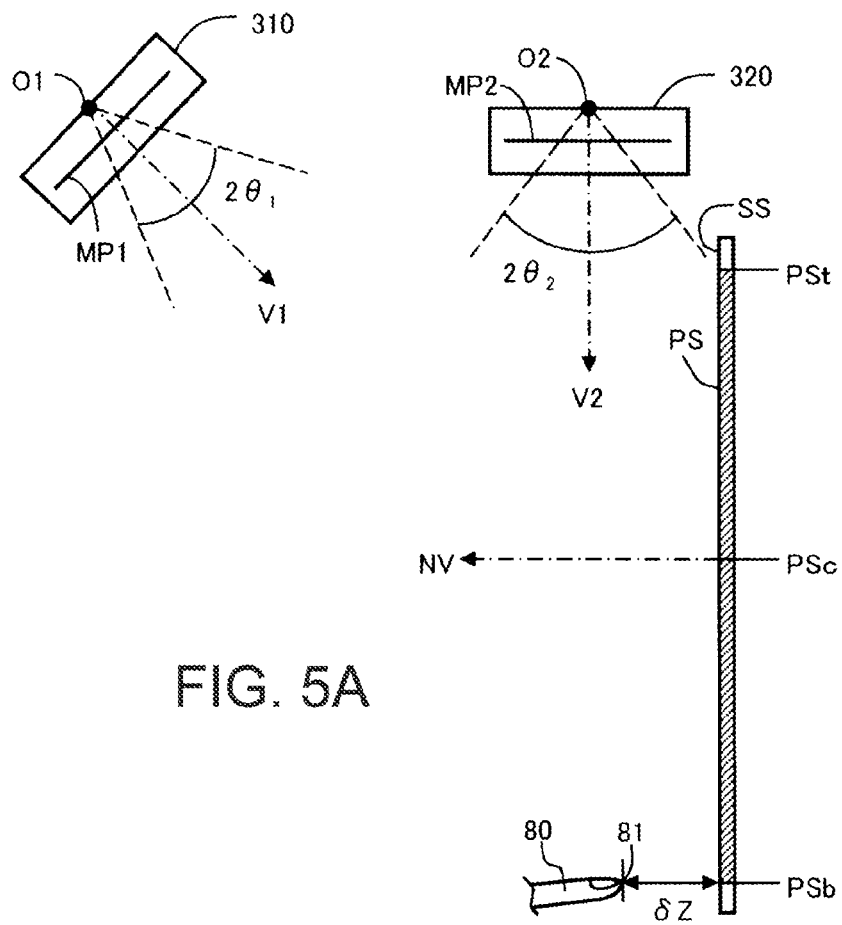
FIG. 5A
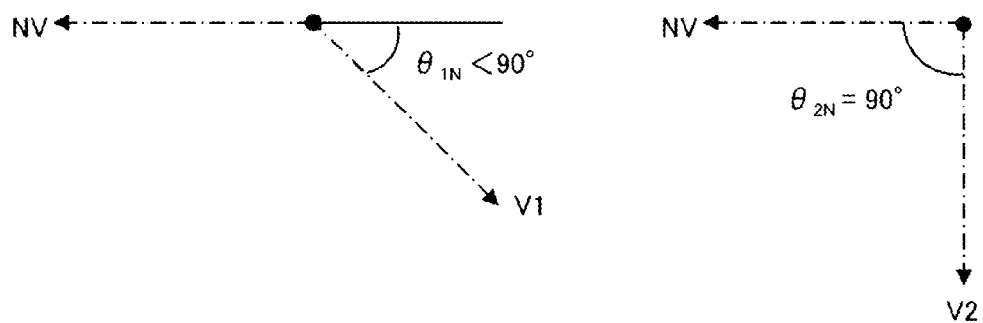
$|V1 \cdot NV| = |V1||NV|\cos\theta_{1N} > 0$   $|V2 \cdot NV| = |V2||NV|\cos\theta_{2N} = 0$
FIG. 5B                                      FIG. 5C L1 < L2 ⋯(3a)
L2 = (δZ · δM / d) ⋯(3b)
WHERE
L1: SIZE OF IMAGE AT DISTANCE δZ IN FIRST CAMERA 310
L2: SIZE OF IMAGE AT DISTANCE δZ IN SECOND CAMERA 320

$\theta_{1b} < \theta_{2b}$ $\theta_{1b}$: ANGLE BETWEEN STRAIGHT LINE SG1 EXTENDING FROM FIRST CAMERA 310 TOWARD LOWER END PSb OF PROJECTED SCREEN AND OPTICAL AXIS V1

$\theta_{2b}$: ANGLE BETWEEN STRAIGHT LINE SG2 EXTENDING FROM SECOND CAMERA 320 TOWARD LOWER END PSb OF PROJECTED SCREEN AND OPTICAL AXIS V2

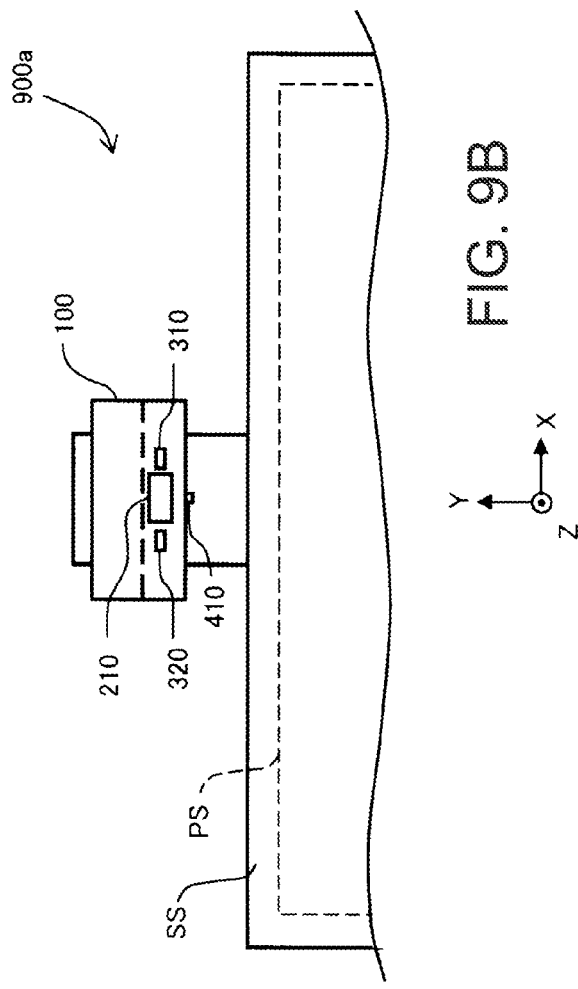
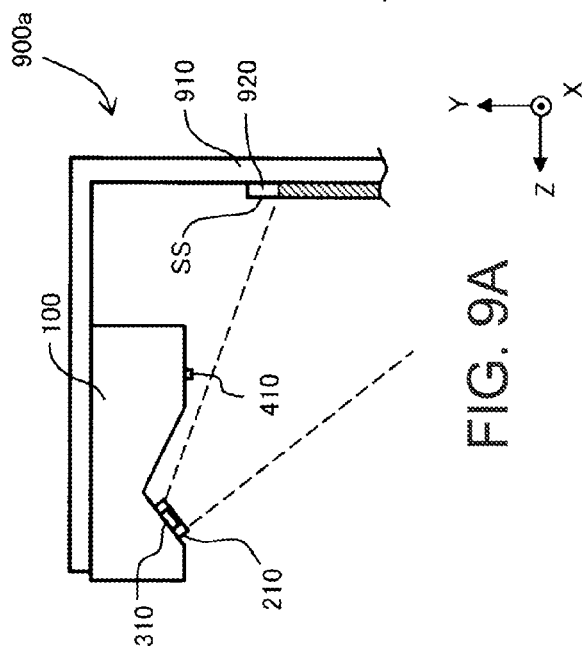
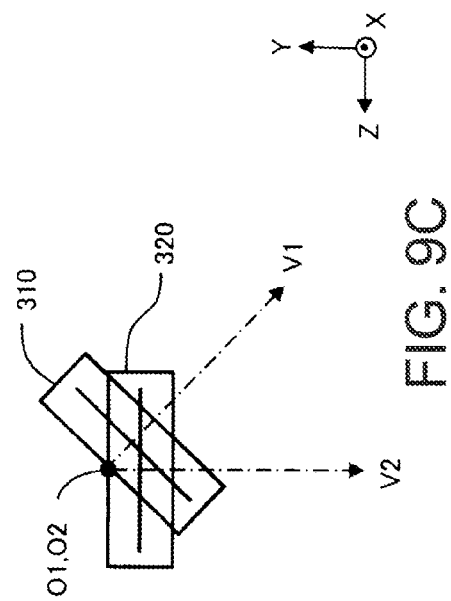

INTERACTIVE PROJECTOR AND INTERACTIVE PROJECTION SYSTEM

The entire disclosure of Japanese Patent Application No. 2015-065630, filed Mar. 27, 2015 is expressly incorporated by reference herein.

BACKGROUND

1. Technical Field

The present invention relates to an interactive projector capable of receiving an instruction on a projected screen by a pointing element of a user, and a system thereof.

2. Related Art

Patent Document 1 (JP-A-2012-150636) discloses a projection display apparatus (projector) capable of projecting a projected screen on a screen, and capturing an image containing an object such as a finger using a camera and detecting a position of the object using the captured image. The object such as a finger is used as a pointing element for giving an instruction on a projected screen. That is, the projector recognizes that a predetermined instruction of drawing or the like is input to the projected screen when the tip of the object is in contact with the screen, and redraws the projected screen according to the instruction. Therefore, a user can input various instructions using the projected screen as a user interface. As described above, the projector of the type capable of using the projected screen on the screen as an enterable user interface is called "interactive projector". Further, the object used for giving an instruction on the projected screen is called "pointing element".

In a typical interactive projector, whether or not an instruction is given by a pointing element is determined according to whether or not the tip of the pointing element is in contact with a screen. Therefore, detection of a distance between the tip of the pointing element and the screen is important. However, in related art, the detection accuracy of the distance between the tip of the pointing element and the screen is not necessarily sufficient and improvement of the detection accuracy is desired.

SUMMARY

An advantage of some aspects of the invention is to solve at least a part of the problems described above, and the invention can be implemented as the following aspects or application examples.

(1) An aspect of the invention provides an interactive projector capable of receiving an instruction on a projected screen by a pointing element of a user. The interactive projector includes a projection section for projecting the projected screen on a screen surface, a plurality of cameras including a first camera and a second camera adapted to capture images of an area of the projected screen, and a position detection section adapted to detect a three-dimensional position of the pointing element with respect to the projected screen based on a plurality of images containing the pointing element captured by the plurality of cameras. Further, when a unit vector representing a normal direction of the projected screen is defined as a projected-screen normal vector, a unit vector representing a direction of an optical axis of the first camera is defined as a first optical axis vector, and a unit vector representing a direction of an optical axis of the second camera is defined as a second optical axis vector, the first camera and the second camera are arranged such that an absolute value of an inner product of the second optical axis vector and the projected-screen normal vector is smaller than an absolute value of an inner product of the first optical axis vector and the projected-screen normal vector.

According to the interactive projector, resolution of the image captured by the second camera is higher with respect to the normal direction of the projected screen than that of the image captured by the first camera, and thus, the distance of the pointing element from the projected screen may be determined with higher accuracy.

(2) In the interactive projector described above, when two directions orthogonal to each other on the projected screen are defined as X direction and Y direction where +Y direction is called an upper direction while −Y direction is called a lower direction, the projected screen is defined to be projected on a lower position of the interactive projector, and a direction perpendicular to the X direction and the Y direction is defined as Z direction, an intersection point of a lower side of the projected screen and a first Y-Z plane is defined as a first intersection point where the lower side is a lower one of two sides of the projected screen opposing to each other in the Y direction, and the first Y-Z plane passes a lens center of the first camera, an angle between a line connecting the lens center of the first camera and the first intersection point and the optical axis of the first camera is defined as a first angle, an intersection point of the lower side of the projected screen and a second Y-Z plane is defined as a second intersection point where the second Y-Z plane passes a lens center of the second camera, and an angle between a line connecting the lens center of the second camera and the second intersection point and the optical axis of the second camera is defined as a second angle, the first camera and the second camera may be arranged such that the second angle is larger than the first angle.

According to this configuration, the distance of the pointing element from the projected screen near the projected screen may be determined more accurately.

(3) In the interactive projector described above, the second camera may be arranged such that a perpendicular distance of the second camera from the projected screen is smaller than that of the first camera.

According to this configuration, the distance of the pointing element from the projected screen near the projected screen may be determined more accurately.

(4) In the interactive projector described above, the second camera may be arranged such that a distance of the second camera measured from a center of the projected screen in a direction perpendicular to the normal direction of the projected screen is smaller than that of the first camera.

According to this configuration, the distance of the pointing element from the projected screen near the projected screen may be determined more accurately.

(5) In the interactive projector described above, an angle between the second optical axis vector and the projected-screen normal vector may be in a range of $90°±10°$.

According to this configuration, the distance of the pointing element from the projected screen may be determined more accurately.

The invention may be realized in various forms such as, e.g., a system including one or both of a screen and a self-emitting pointing element and an interactive projector, a control method or control apparatus for the interactive projector, a computer program for realization of functions of the method or apparatus, and a non-transitory storage medium in which the computer program is recorded.

BRIEF DESCRIPTION OF THE DRAWINGS

The invention will be described with reference to the accompanying drawings, wherein like numbers reference like elements.

FIGS. 2A and 2B are a side view and a front view of the interactive projection system.

FIGS. 4A and 4B are explanatory diagrams showing operations using the self-emitting pointing element and a non-emitting pointing element.

FIGS. 5A to 5C are explanatory diagrams showing arrangement and orientation of two cameras.

FIGS. 9A to 9C are explanatory diagrams showing arrangement of two cameras in another embodiment.

DESCRIPTION OF EXEMPLARY EMBODIMENTS

A. Outline of System

Figure 1:
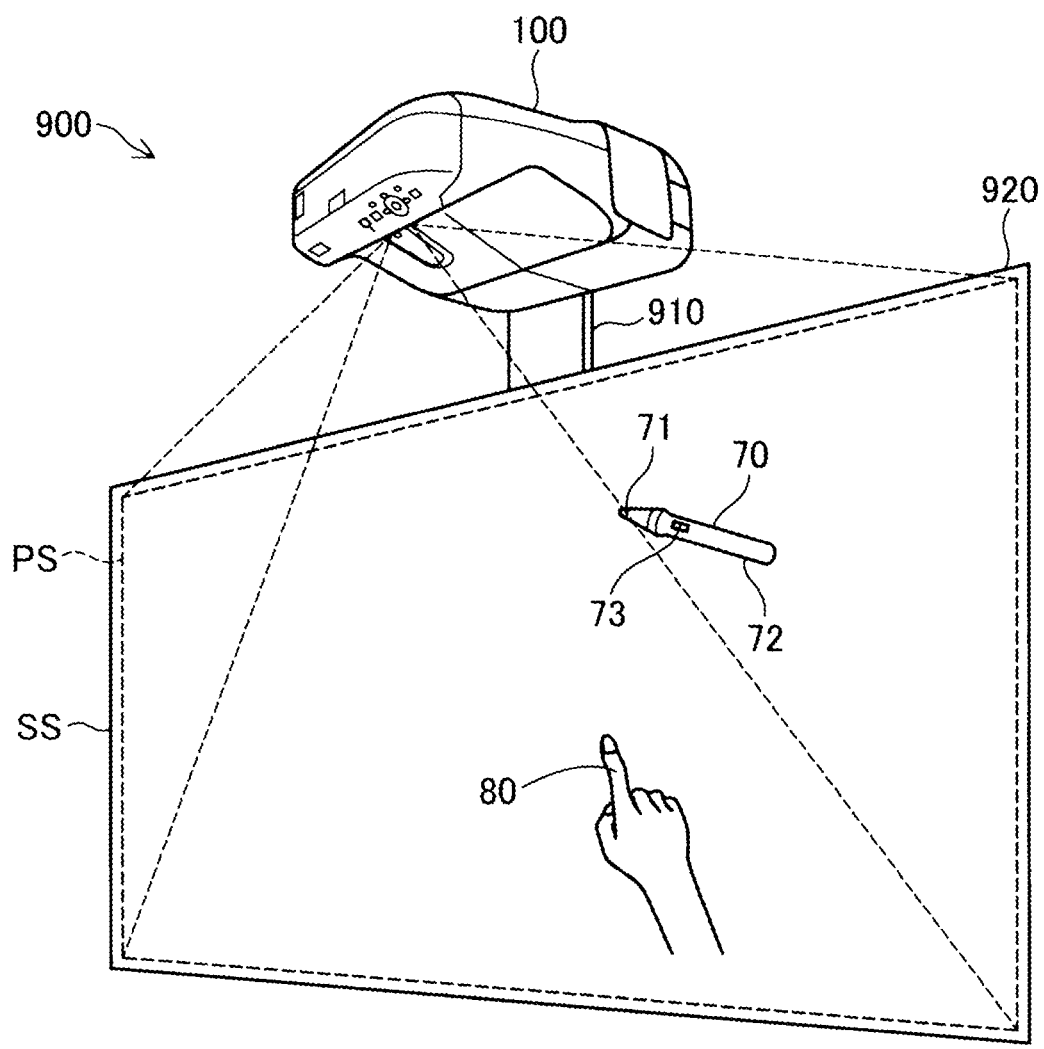
FIG. 1 is a perspective view of an interactive projection system.

FIG. 1 is a perspective view of an interactive projection system 900 in one embodiment of the invention. The system 900 has an interactive projector 100, a screen board 920, and a self-emitting pointing element 70. The front surface of the screen board 920 is used as a projection screen surface SS. The projector 100 is fixed in front of and above the screen board 920 by a support member 910. Note that the projection screen surface SS is vertically provided in FIG. 1, however, the projection screen surface SS may be horizontally provided for use of the system 900.

The projector 100 projects a projected screen PS on the projection screen surface SS. The projected screen PS generally contains an image drawn within the projector 100. When there is no image drawn within the projector 100, light is applied from the projector 100 to the projected screen PS and a white image is displayed. In the specification, "projection screen surface SS" (or "screen surface SS") refers to a surface of a member on which an image is projected. Further, "projected screen PS" refers to an area of an image projected on the projection screen surface SS by the projector 100. Generally, the projected screen PS is projected on a part of the projection screen surface SS.

The self-emitting pointing element 70 is a pen-shaped pointing element having a tip part 71 that can emit light, a shaft part 72 held by a user, and a button switch 73 provided in the shaft part 72. The configuration and the function of the self-emitting pointing element 70 will be described later. In the system 900, one or more non-emitting pointing elements 80 (e.g., a non-emitting pen or a finger) can be used together with one or more self-emitting pointing elements 70.

FIG. 2A is a side view of the interactive projection system 900 and FIG. 2B is a front view thereof. In the specification, the lateral directions of the screen surface SS are defined as X directions, vertical directions of the screen surface SS are defined as Y directions, and directions along the normal of the screen surface SS are defined as Z directions. For convenience, the X directions are also called "lateral directions", the Y directions are also called "vertical directions", and the Z directions are also called as "anteroposterior directions". Further, of the Y directions (vertical directions), the direction in which the projected screen PS exists as seen from the projector 100 is called "lower direction". In FIG. 2A, for convenience of illustration, the range of the projected screen PS of the screen board 920 is hatched.

The projector 100 has a projection lens 210 that projects the projected screen PS on the screen surface SS, a first camera 310 and a second camera 320 that capture the area of the projected screen PS, and a detection light application unit 410 for applying detection light to the pointing element (the self-emitting pointing element 70 or the non-emitting pointing element 80). As the detection light, e.g., near-infrared light is used. The two cameras 310, 320 have at least a first capture function of receiving and capturing light in a wavelength region containing the wavelength of the detection light. At least one of the two cameras 310, 320 further have a second capture function of receiving and capturing light containing visible light. It is preferable that the cameras are adapted to switch these two capture functions. For example, it is preferable that the two cameras 310, 320 each has a near-infrared filter switching mechanism (not shown) that can place a near-infrared filter for blocking visible light and passing only near-infrared light in front of the lens and retracting the filter from the front of the lens. The arrangement and orientation of the two cameras 310, 320 will be further described later.

The example in FIG. 2B shows a state in which the interactive projection system 900 operates in a whiteboard mode. The whiteboard mode is a mode in which the user can arbitrarily draw images on the projected screen PS using the self-emitting pointing element 70 and the non-emitting pointing element 80. On the screen surface SS, the projected screen PS containing a toolbox TB is projected. The toolbox TB includes an undo button UDB for undoing processing, a pointer button PTB for selecting a mouse pointer, a pen button PEB for selecting a pen tool for drawing, an eraser button ERB for selecting an eraser tool for erasing the drawn image, and a forward/backward button FRB for moving the screen forward and backward. The user clicks these buttons using the pointing element, and thereby, can perform processing in response to the buttons and select the tools. Note that, immediately after the start of the system 900, the mouse pointer may be selected as a default tool. In the example of FIG. 2B, there is illustrated a state in which, by the user selecting the pen tool and then moving the tip part 71 of the self-emitting pointing element 70 in contact with the screen surface SS within the projected screen PS, a line is drawn within the projected screen PS. The drawing of the line is performed by a projection image creating unit, which will be described later, within the projector 100.

The interactive projection system 900 is also operable in other modes than the whiteboard mode. For example, the system 900 is also operable in a PC interactive mode in which an image of data transferred from a personal computer (not shown) via a communication line is displayed on the projected screen PS. In the PC interactive mode, for example, an image of data of spreadsheet software or the like is displayed, and entry, creation, modification, etc. of data can be performed using various tools and icons displayed within the image.

Figure 3:
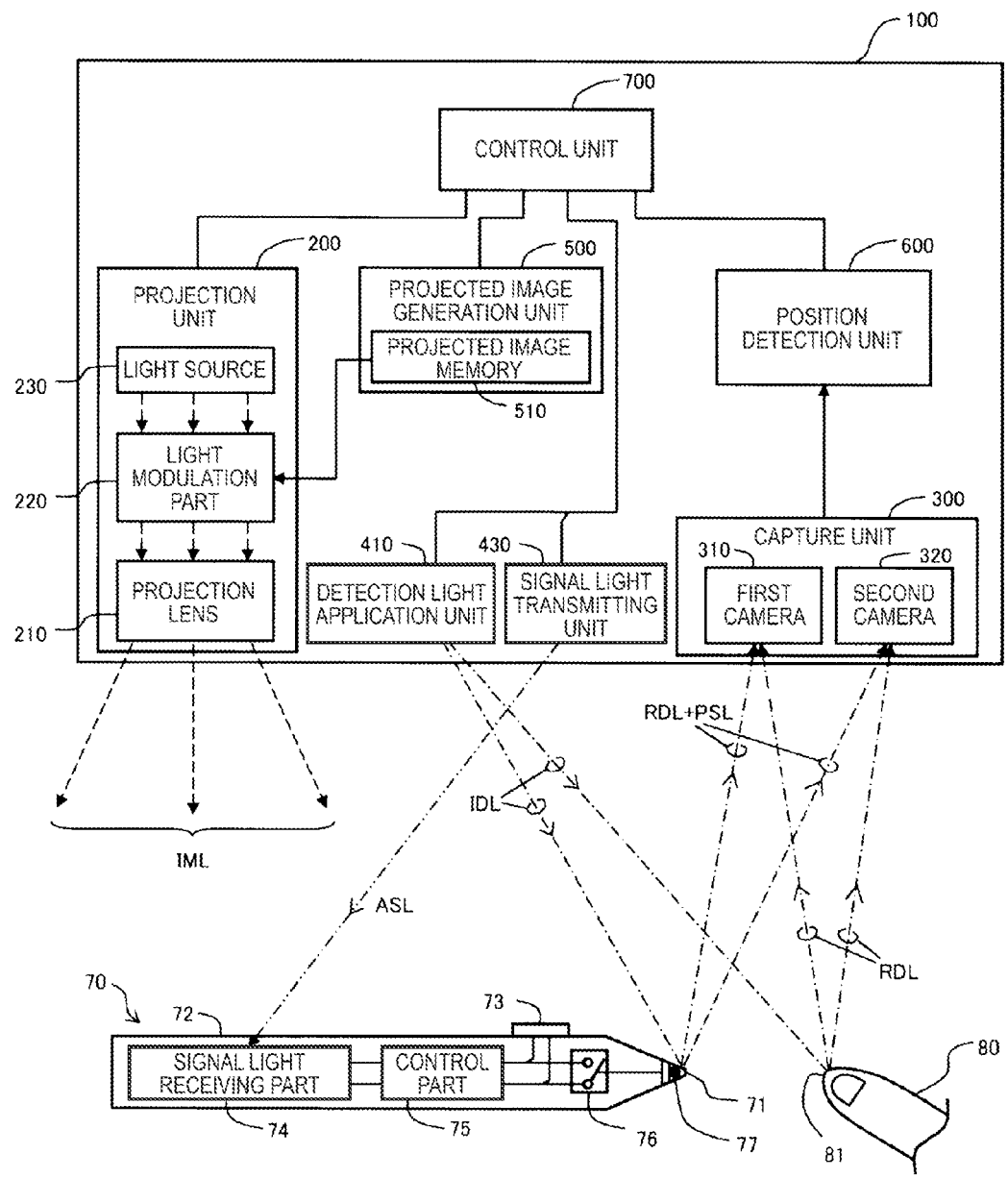
FIG. 3 is a block diagram showing internal configurations of a projector and a self-emitting pointing element.

FIG. 3 is a block diagram showing internal configurations of the interactive projector 100 and the self-emitting pointing element 70. The projector 100 has a control unit 700, a projection unit 200, a projected image generation unit 500, a position detection unit 600, a capture unit 300, a detection light application unit 410, and a signal light transmitting unit 430.

The control unit 700 performs control of the respective parts within the projector 100. Further, the control unit 700 determines a content of an instruction given on the projected screen PS by the pointing element (self-emitting pointing element 70 or non-emitting pointing element 80) detected by the position detection unit 600, and commands the projected image generation unit 500 to create or change the projected image according to the content of the instruction.

The projected image generation unit 500 has a projected image memory 510 that stores the projected image, and has a function of generating the projected image projected on the screen surface SS by the projection unit 200. It is preferable that the projected image generation unit 500 further has a function as a keystone correction part that corrects keystone distortion of the projected screen PS (FIG. 2B).

The projection unit 200 has a function of projecting the projected image generated by the projected image generation unit 500 on the screen surface SS. The projection unit 200 has a light modulation part 220 and a light source 230 in addition to the projection lens 210 explained in FIGS. 2A and 2B. The light modulation part 220 forms projected image light IML by modulating light from the light source 230 in response to projected image data provided from the projected image memory 510. The projected image light IML is typically color image light containing visible lights of three colors of RGB, and projected on the screen surface SS by the projection lens 210. Note that as the light source 230, there can be adopted a variety of types of light source such as a light-emitting diode or a laser diode, or the light source lamp such as a super-high pressure mercury lamp. Further, as the light modulation section 220, there can be adopted a transmissive or reflective liquid crystal panel, a digital mirror device, or the like, and a configuration provided with a plurality of light modulation parts 220 for respective colored light beams can also be adopted.

The detection light application unit 410 applies applied detection light IDL for detection of the tip parts of the pointing elements (self-emitting pointing element 70 and non-emitting pointing element 80) to the screen surface SS and over the space in front thereof. As the applied detection light IDL, e.g., near-infrared light is used. The detection light application unit 410 is turned on in a predetermined period containing the capture times of the cameras 310, 320 and turned off in the other periods. Alternately, the detection light application unit 410 may be constantly maintained in the lighting state during operation of the system 900.

The signal light transmitting unit 430 has a function of transmitting apparatus signal light ASL received by the self-emitting pointing element 70. The apparatus signal light ASL is a near-infrared light signal for synchronization, and is emitted from the signal light transmitting unit 430 of the projector 100 to the self-emitting pointing element 70 at regular intervals. A tip light emitting part 77 of the self-emitting pointing element 70 emits pointing element signal light PSL, which will be described later, as near-infrared light having a predetermined light emission pattern (light emission sequence) in synchronization with the apparatus signal light ASL. Further, the cameras 310, 320 of the capture unit 300 execute capturing at predetermined times in synchronization with the apparatus signal light ASL when the position detection of the pointing elements (self-emitting pointing element 70 and non-emitting pointing element 80) is performed.

The capture unit 300 has the first camera 310 and the second camera 320 explained in FIGS. 2A and 2B. As described above, the two cameras 310, 320 have a function of receiving and capturing light in the wavelength region containing the wavelength of the detection light. In the example of FIG. 3, a state in which the applied detection light IDL applied by the detection light application unit 410 is reflected by the pointing elements (self-emitting pointing element 70 and non-emitting pointing element 80) and the reflected detection light RDL is received and captured by the two cameras 310, 320 is illustrated. The two cameras 310, 320 further receive and capture the pointing element signal light PSL as near-infrared light emitted from the tip light emitting part 77 of the self-emitting pointing element 70. The capturing by the two cameras 310, 320 is executed in both a first period when the applied detection light IDL emitted by the detection light application unit 410 is on (light emission state) and a second period when the applied detection light IDL is off (non-light emission state). The position detection unit 600 compares images in the two kinds of periods, and thereby, can determine whether the individual pointing elements contained in the images are the self-emitting pointing element 70 or the non-emitting pointing element 80.

Note that it is preferable that at least one of the two cameras 310, 320 has a capture function using lights containing visible light in addition to the capture function using lights containing near-infrared light. According to the configuration, the projected screen PS projected on the screen surface SS is captured by the camera and the projected image generation unit 500 can execute keystone correction using the image. The method of keystone correction using one or more cameras is known, and the explanation is omitted here.

The position detection unit 600 has a function of determining the three-dimensional position of the tip part of the pointing element (self-emitting pointing element 70 or non-emitting pointing element 80) using the images captured by the two cameras 310, 320 and utilizing triangulation. In this regard, the position detection unit 600 also determines whether the individual pointing elements within the images are the self-emitting pointing element 70 or the non-emitting pointing element 80 utilizing the light emission pattern of the self-emitting pointing element 70.

In the self-emitting pointing element 70, a signal light receiving part 74, a control part 75, a tip switch 76, and the tip light emitting part 77 are provided in addition to the button switch 73. The signal light receiving part 74 has a function of receiving the apparatus signal light ASL emitted from the signal light transmitting unit 430 of the projector 100. The tip switch 76 is a switch turned on when the tip part 71 of the self-emitting pointing element 70 is pressed and turned off when the tip part 71 is released. The tip switch 76 is usually off and turned on by a contact pressure applied when the tip part 71 of the self-emitting pointing element 70 is in contact with the screen surface SS. When the tip switch 76 is off, the control part 75 allows the tip light emitting part 77 to emit light in a specified first light emission pattern representing that the tip switch 76 is off, and thereby, emits the pointing element signal light PSL having the first light emission pattern. On the other hand, when the tip switch 76 is turned on, the control part 75 allows the tip light emitting part 77 to emit light in a specified second light emission pattern representing that the tip switch 76 is on, and thereby, emits the pointing element signal light PSL having the second light emission pattern. These first light emission pattern and second light emission pattern are different from each other, and thus, the position detection unit 600 can identify the on state or off state of the tip switch 76 by analyzing the images captured by the two cameras 310, 320.

As described above, in the embodiment, the contact determination as to whether or not the tip part 71 of the self-emitting pointing element 70 is in contact with the screen surface SS is performed according to on/off of the tip switch 76. The three-dimensional position of the tip part 71 of the self-emitting pointing element 70 may be obtained by triangulation using the images captured by the two cameras 310, 320, and thereby, it may be possible to execute the contact determination of the tip part 71 of the self-emitting pointing element 70 using the three-dimensional position. However, the detection accuracy of the Z coordinate (the coordinate in the normal direction of the screen surface SS) by triangulation may not necessarily be high. Therefore, it is preferable to perform contact determination according to on/off of the tip switch 76 because the contact determination may be executed more accurately.

The button switch 73 of the self-emitting pointing element 70 has the same function as that of the tip switch 76. Therefore, the control part 75 allows the tip light emitting part 77 to emit light in the second light emission pattern when the button switch 73 is pressed by the user and allows the tip light emitting part 77 to emit light in the first light emission pattern when the button switch 73 is not pressed. In other words, the control part 75 allows the tip light emitting part 77 to emit light in the second light emission pattern when at least one of the tip switch 76 and the button switch 73 is on and allows the tip light emitting part 77 to emit light in the first light emission pattern when both of the tip switch 76 and the button switch 73 are off.

The different function from that of the tip switch 76 may be assigned to the button switch 73. For example, in the case where the same function as that of the right-click button of the mouse is assigned to the button switch 73, when the user presses the button switch 73, the instruction of the right click is transmitted to the control unit 700 of the projector 100 and processing in response to the instruction is executed. As described above, in the case where the different function from that of the tip switch 76 is assigned to the button switch 73, the tip light emitting part 77 emits light in four light emission patterns different from one another in response to the on/off states of the tip switch 76 and the on/off states of the button switch 73. In this case, the self-emitting pointing element 70 can distinguish and transmit the four combinations of the on/off states of the tip switch 76 and the button switch 73 to the projector 100.

FIGS. 4A and 4B are explanatory diagrams showing operations using the self-emitting pointing element 70 and the non-emitting pointing element 80. In this example, both the tip part 71 of the self-emitting pointing element 70 and a tip part 81 of the non-emitting pointing element 80 are apart from the screen surface SS. The XY coordinates $(X_{71}, Y_{71})$ of the tip part 71 of the self-emitting pointing element 70 are located on the eraser button ERB of the toolbox TB. Further, here, the mouse pointer PT is selected as the tool representing the function of the tip part 71 of the self-emitting pointing element 70, the mouse pointer PT is drawn on the projected screen PS so that a tip $OP_{71}$ of the mouse pointer PT exists on the eraser button ERB. As described above, the three-dimensional position of the tip part 71 of the self-emitting pointing element 70 is determined by triangulation using the images captured by the two cameras 310, 320. Therefore, on the projected screen PS, the mouse pointer PT is drawn so that the operation point $OP_{71}$ on the tip of the mouse pointer PT may be placed in the position of the XY coordinates $(X_{71}, Y_{71})$ of the three-dimensional coordinates $(X_{71}, Y_{71}, Z_{71})$ of the tip part 71 determined by triangulation. That is, the tip $OP_{71}$ of the mouse pointer PT is placed on the XY coordinates $(X_{71}, Y_{71})$ of the three-dimensional coordinates $(X_{71}, Y_{71}, Z_{71})$ of the tip part 71 of the self-emitting pointing element 70, and the user gives an instruction in the position. For example, in this state, the user can select the eraser tool by pressing the button switch 73 of the self-emitting pointing element 70. As described above, in the embodiment, even when the self-emitting pointing element 70 is apart from the screen surface SS, the user can give the instruction in response to the content of the projected screen PS at the operation point $OP_{71}$ placed on the XY coordinates $(X_{71}, Y_{71})$ of the tip part 71 to the projector 100 by pressing the button switch 73.

In FIG. 4B, the pen tool PE as the tool representing the function of the tip part 81 of the non-emitting pointing element 80 is also selected and the pen tool PE is drawn on the projected screen PS. As described above, the three-dimensional position of the tip part 81 of the non-emitting pointing element 80 is determined by triangulation using the images captured by the two cameras 310, 320. Therefore, on the projected screen PS, the pen tool PE is drawn so that the operation point $OP_{81}$ on the tip of the pen tool PE may be placed in the position of the XY coordinates $(X_{81}, Y_{81})$ of the three-dimensional coordinates $(X_{81}, Y_{81}, Z_{81})$ of the tip part 81 determined by triangulation. Note that, when the user gives an instruction to the projector 100 using the non-emitting pointing element 80, the instruction (drawing, selection of the tool, or the like) is given with the tip part 81 of the non-emitting pointing element 80 in contact with the projected screen PS.

In the example of FIGS. 4A and 4B, even when the pointing element (self-emitting pointing element 70 or non-emitting pointing element 80) is apart from the projected screen PS, the tool selected by the individual pointing element (mouse pointer PT or pen tool PE) is drawn and displayed on the projected screen PS. Therefore, there are advantages that, even when the user does not bring the tip part of the pointing element in contact with the projected screen PS, the tool selected by the pointing element is readily understood and the operation is easy. Further, the tool is drawn so that the operation point OP of the tool may be placed in the position of the XY coordinates of the three-dimensional coordinates of the tip part of the pointing element, and thus, there is an advantage that the user may appropriately recognize the position of the tool in use.

The interactive projection system 900 may be adapted to use a plurality of the self-emitting pointing elements 70 at the same time. In this case, it is preferable that the above-described light emission patterns of the pointing element signal light PSL are unique light emission patterns by which the plurality of self-emitting pointing elements 70 are identified. More specifically, when N (N is an integer number equal to or more than two) self-emitting pointing elements 70 can be used at the same time, it is preferable that the N self-emitting pointing elements 70 may be distinguished by the light emission patterns of the pointing element signal light PSL. Note that, when one set of light emission patterns include a plurality of unit light emission periods, in one unit light emission period, two values of light emission and non-light emission may be represented. Here, one unit light emission period corresponds to a period in which the tip light emission part 77 of the self-emitting pointing element 70 represents one-bit information of on/off. When one set of light emission patterns include M (M is an integer number equal to or more than two) unit light emission periods, $2^M$ states may be distinguished by the one set of light emission patterns. Therefore, it is preferable that the number M of unit light emission periods forming the one set of light emission patterns is set to satisfy the following formula.

$$N \times Q \leq 2^M \quad (1)$$

where Q is the number of states distinguished by the switches 73, 76 of the self-emitting pointing elements 70, and Q=2 or Q=4 in the example of the embodiment. For example, it is preferable that, if Q=4, when N=2, M is set to an integer number equal to or more than three, and when N=3 or 4, M is set to an integer number equal to or more than four. In this regard, when the position detection unit 600 (or the control unit 700) identifies the N self-emitting pointing elements 70 and the states of the switches 73, 76 of the respective self-emitting pointing elements 70, the identification is executed using M images respectively captured by the respective cameras 310, 320 in the M unit light emission periods of the one set of light emission patterns. The M bits light emission pattern is a light emission pattern in which the pointing element signal light PSL is set to on or off in the state that an applied detection light IDL is maintained to the off state, and the non-emitting pointing element 80 does not come out in the images captured by the cameras 310 and 320. Therefore, in order to capture an image to be used for detecting the position of the non-emitting pointing element 80, it is preferable that a 1-bit unit light emission period in which the applied detection light IDL is set to the on state is further added. In this regard, the pointing element signal light PSL during the unit light emission period for the position detection may be either on or off. The image captured in the unit light emission period for the position detection can also be used for the position detection of the self-emitting pointing element 70.

The outline of the specific examples of five kinds of signal light drawn in FIG. 3 is as follows.

(1) projected image light IML: image light (visible light) projected on the screen surface SS by the projection lens 210 for projection of the projected screen PS on the screen surface SS.

(2) applied detection light IDL: near-infrared light applied to the screen surface SS and over the space in front thereof by the detection light application unit 410 for detection of the tip parts of the pointing elements (self-emitting pointing element 70 and non-emitting pointing element 80).

(3) reflected detection light RDL: near-infrared light reflected by the pointing elements (self-emitting pointing element 70 and non-emitting pointing element 80) and received by the two cameras 310, 320 out of the near-infrared light applied as the applied detection light IDL.

(4) apparatus signal light ASL: near-infrared light emitted from the signal light transmitting unit 430 of the projector 100 at regular intervals for synchronization with the self-emitting pointing element 70.

(5) pointing element signal light PSL: near-infrared light emitted from the tip light emitting part 77 of the self-emitting pointing element 70 at times in synchronization between the projector 100 and the apparatus signal light ASL. The light emission pattern of the pointing element signal light PSL is changed in response to the on/off states of the switches 73, 76 of the self-emitting pointing element 70. Further, the light has unique light emission patterns by which a plurality of self-emitting pointing elements 70 are identified.

In the embodiment, the position detection of the tip ends of the self-emitting pointing element 70 and the non-emitting pointing element 80 and discrimination of the contents instructed by the self-emitting pointing element 70 and the non-emitting pointing element 80 are respectively executed in the following manner.

Outline of Method of Detecting Position of Self-Emitting Pointing Element 70 and Method of Discriminating Instruction Content The three-dimensional position $(X_{71}, Y_{71}, Z_{71})$ of the tip part 71 of the self-emitting pointing element 70 is determined by the position detection unit 600 using the images captured by the two cameras 310, 320 according to triangulation. In this regard, whether the self-emitting pointing element 70 or not can be recognized by determination as to whether or not the light emission pattern of the tip light emitting part 77 appears in the images captured at predetermined times. Further, the unit can discriminate whether or not the tip part 71 of the self-emitting pointing element 70 is in contact with the screen surface SS (i.e., whether or not the tip switch 76 is on) using the light emission pattern of the tip light emitting part 77 in the images captured at the plurality of times. The position detection unit 600 can further discriminate the instruction content in response to the on/off states of the switches 73, 76 of the self-emitting pointing element 70 and the content of the projection screen surface SS on the XY coordinates $(X_{71}, Y_{71})$ of the tip part 71. For example, as exemplified in FIG. 4B, when the tip switch 76 is turned on with the position of the XY coordinates $(X_{71}, Y_{71})$ of the tip part 71 on one button within the toolbox TB, the tool of the button is selected. Further, as exemplified in FIG. 2B, when the XY coordinates $(X_{71}, Y_{71})$ of the tip part 71 are in a position out of the toolbox TB within the projected screen PS, processing by the selected tool (e.g., drawing) is selected. The control unit 700 allows the projected image generation unit 500 to draw the previously selected pointer or mark so that the pointer or mark may be placed in the position $(X_{71}, Y_{71})$ within the projected screen PS utilizing the XY coordinates $(X_{71}, Y_{71})$ of the tip part 71 of the self-emitting pointing element 70. Further, the control unit 700 executes processing according to the content instructed by the self-emitting pointing element 70 and allows the projected image generation unit 500 to draw an image containing the processing result.

Outline of Method of Detecting Position of Non-Emitting Pointing Element 80 and Method of Discriminating Instruction Content The three-dimensional position $(X_{81}, Y_{81}, Z_{81})$ of the tip part 81 of the non-emitting pointing element 80 is also determined by triangulation using the images captured by the two cameras 310, 320. In this regard, whether the non-emitting pointing element 80 or not can be recognized by determination as to whether or not the light emission pattern of the self-emitting pointing element 70 appears in the images captured at predetermined times. Note that the positions of the tip parts 81 of the non-emitting pointing elements 80 in the two images captured by the two cameras 310, 320 may be determined utilizing a known technology such as template matching or feature extraction. For example, when the tip part 81 of the non-emitting pointing element 80 as a finger is recognized by template matching, a plurality of templates of fingers are prepared in advance and parts matching the templates are searched for in the images captured by the two cameras 310, 320, and thereby, the tip part 81 of the finger can be recognized. Further, whether or not the tip part 81 of the non-emitting pointing element 80 is in contact with the screen surface SS can be determined according to whether or not the difference between the Z coordinate value of the tip part 81 determined by triangulation and the Z coordinate value on the surface of the screen surface SS is equal to or less than a minute tolerance, i.e., whether or not the tip part 81 is sufficiently closer to the surface of the screen surface SS. It is preferable to use a small value of e.g., about 2 mm to 6 mm as the tolerance. Furthermore, when the position detection unit 600 determines that the tip part 81 of the non-emitting pointing element 80 is in contact with the screen surface SS, it discriminates the instruction content in response to the content of the projection screen surface SS in the contact position. The control unit 700 allows the projected image generation unit 500 to draw the previously selected pointer or mark so that the pointer or mark may be placed in the position ($X_{81}, Y_{81}$) within the projected screen PS utilizing the XY coordinates ($X_{81}, Y_{81}$) of the tip of the non-emitting pointing element 80 detected by the position detection unit 600. Further, the control unit 700 executes processing according to the content instructed by the non-emitting pointing element 80 and allows the projected image generation unit 500 to draw an image containing the processing result.

B. Preferable Arrangement and Orientation of Cameras (Part 1)

FIG. 5A is an explanatory diagram showing arrangement and orientation of the two cameras 310, 320. The drawing shows arrangement on the Y-Z planes passing through the camera reference positions O1, O2 of the respective cameras 310, 320. The first camera 310 is placed in the position at the larger perpendicular distance (distance in the Z direction) from the screen surface SS than the second camera 320. Here, the arrangement of the two cameras 310, 320 and the screen surface SS is modeled as follows.

(1) image surfaces MP1, MP2: imaging surfaces of the respective cameras. In the actual cameras, the image surfaces MP1, MP2 correspond to light receiving surfaces of image sensors.

(2) camera reference positions O1, O2: reference coordinate positions of the respective cameras. In the model of FIG. 5A, in the first camera 310, an image on the image surface MP1 corresponding to an arbitrary object point within the three-dimensional space is formed in a position of intersection between the line connecting the object point and the camera reference position O1 and the image surface MP1. The same applies to the second camera 320. In the actual cameras, the camera reference positions O1, O2 correspond to the focus positions nearly at the centers of the lenses of the cameras. Further, in the actual cameras, the centers of the lenses are located anterior to the image surfaces MP1, MP2. Note that, if the image surfaces MP1, MP2 are located anterior to the camera reference positions O1, O2 (centers of lenses) as shown in FIG. 5A, they are equivalent to the actual cameras.

(3) optical axes V1, V2: optical axes of optical systems of the respective cameras and orthogonal to the image surfaces MP1, MP2. A unit vector in parallel to the optical axis direction is also called "optical axis vector". In the example of FIG. 5A, the optical axis V1 of the first camera 310 is tilted obliquely from normal NV of the projected screen PS, and the optical axis V2 of the second camera 320 is nearly orthogonal to the normal NV of the projected screen PS.

(4) angles of view $2\theta_1$, $2\theta_2$: angles of view of the respective cameras. The orientations of the optical axes V1, V2 and the sizes of the angles of view $2\theta_1$, $2\theta_2$ are set so that the respective cameras 310, 320 may capture the whole projected screen PS. The angles of view $2\theta_1$, $2\theta_2$ of the two cameras 310, 320 may be equal or different.

(5) normal NV of projected screen PS: the normal with respect to the projected screen PS (i.e., the screen surface SS). A unit vector in parallel to the normal direction is also called "normal vector" or "projected-screen normal vector." It is conceivable that the projected screen PS or the screen surface SS is not a plane but a curved surface. In this case, the normal at the geometrical center of the projected screen PS is called "normal NV of projected screen PS."

In FIG. 5A, the state in which the tip part 81 of the non-emitting pointing element 80 is at a distance δZ apart from the projected screen PS. As described above, the three-dimensional position of the tip part 81 of the non-emitting pointing element 80 is determined by triangulation utilizing the images captured by the two cameras 310, 320. As explained in related art, in the interactive projection system 900, it is desired that the distance δZ in the Z direction between the tip part 81 of the non-emitting pointing element 80 and the screen surface SS is accurately detected. Accordingly, in the embodiment, the arrangement and the orientation of the two cameras 310, 320 are managed, and thereby, the detection accuracy of the distance δZ in the Z direction between the tip part 81 of the non-emitting pointing element 80 and the screen surface SS is improved. The detection accuracy of the distance δZ in the Z direction is also called "resolution of Z coordinate".

The resolution of the Z coordinate by the cameras 310, 320 is lowest at the lower end PSb of the projected screen PS, highest at the upper end PSa of the projected screen PS, and intermediate between them at the center PSc of the projected screen PS. This is because the lower end PSb of the projected screen PS is farthest from the cameras 310, 320. Actually, the position in which the resolution of the Z coordinate is the lowest (called "worst position") is the position near the right and left ends of the lower side of the projected screen PS in FIG. 4B. Note that, as shown in FIG. 5A, consideration of the resolution of the Z coordinate on the Y-Z planes respectively passing through the camera reference positions O1, O2 of the respective cameras 310, 320 is sufficient in practice because the resolution of the Z coordinate in the worst position is also proportional to that. As below, regarding the respective cameras 310, 320, the Y-Z planes respectively passing through the camera reference positions O1, O2 are respectively assumed, and the resolution of the Z coordinate at the lower end PSb of the projected screen PS on the Y-Z planes will be considered. Note that the lower end PSb of the projected screen PS in FIG. 5A corresponds to a first intersection point at which the lower side of four sides of the projected screen PS and the first Y-Z plane passing through the camera reference position O1 (i.e., lens center) of the first camera 310 intersect. Similarly, with respect to the second camera 320, the lower end PSb of the projected screen PS in FIG. 5A corresponds to a second intersection point at which the lower side of the projected screen PS and the second Y-Z plane passing through the camera reference position O2 (i.e., lens center) of the second camera 320 intersect.

FIG. 5B shows a relationship between the optical axis vector V1 of the first camera 310 and the projected-screen normal vector NV, and FIG. 5C shows a relationship between the optical axis vector V2 of the second camera 320 and the projected-screen normal vector NV. The optical axis vector V1 of the first camera 310 is obliquely tilted from the projected-screen normal vector NV and an angle $\theta_{1N}$ between the vectors V1, NV is smaller than 90°. An absolute value of the inner product of the optical axis vector V1 of the first camera 310 and the projected-screen normal vector NV|V1·NV| is expressed by the following formula.

$$|V1 \cdot NV| = |V1| \cdot |NV| \cos \theta_{1N} > 0 \quad (2a)$$

On the other hand, the optical axis vector V2 of the second camera 320 is nearly orthogonal to the projected-screen normal vector NV and an angle $\theta_{2N}$ between the vectors V2, NV is about 90°. Therefore, an absolute value of the inner product of the optical axis vector V2 of the second camera 320 and the projected-screen normal vector NV|V2·NV| is expressed by the following formula.

$$|V2 \cdot NV| = |V2| \cdot |NV| \cos \theta_{2N} = 0 \quad (2b)$$

As is understood from the formulae (2a), (2b), in the embodiment, there is a relationship of |V2·NV|<|V1·NV|. The relationship between the absolute values of the inner products can be used as an index representing the relationship between the angles formed by the projected-screen normal vector NV and the optical axis vectors V1, V2 of the respective cameras 310, 320. That is, generally, as the absolute value of the inner product of the optical axis vector and the projected-screen normal vector NV, the angle formed by the optical vector and the projected-screen normal vector NV is closer to 90°.

Figure 6:
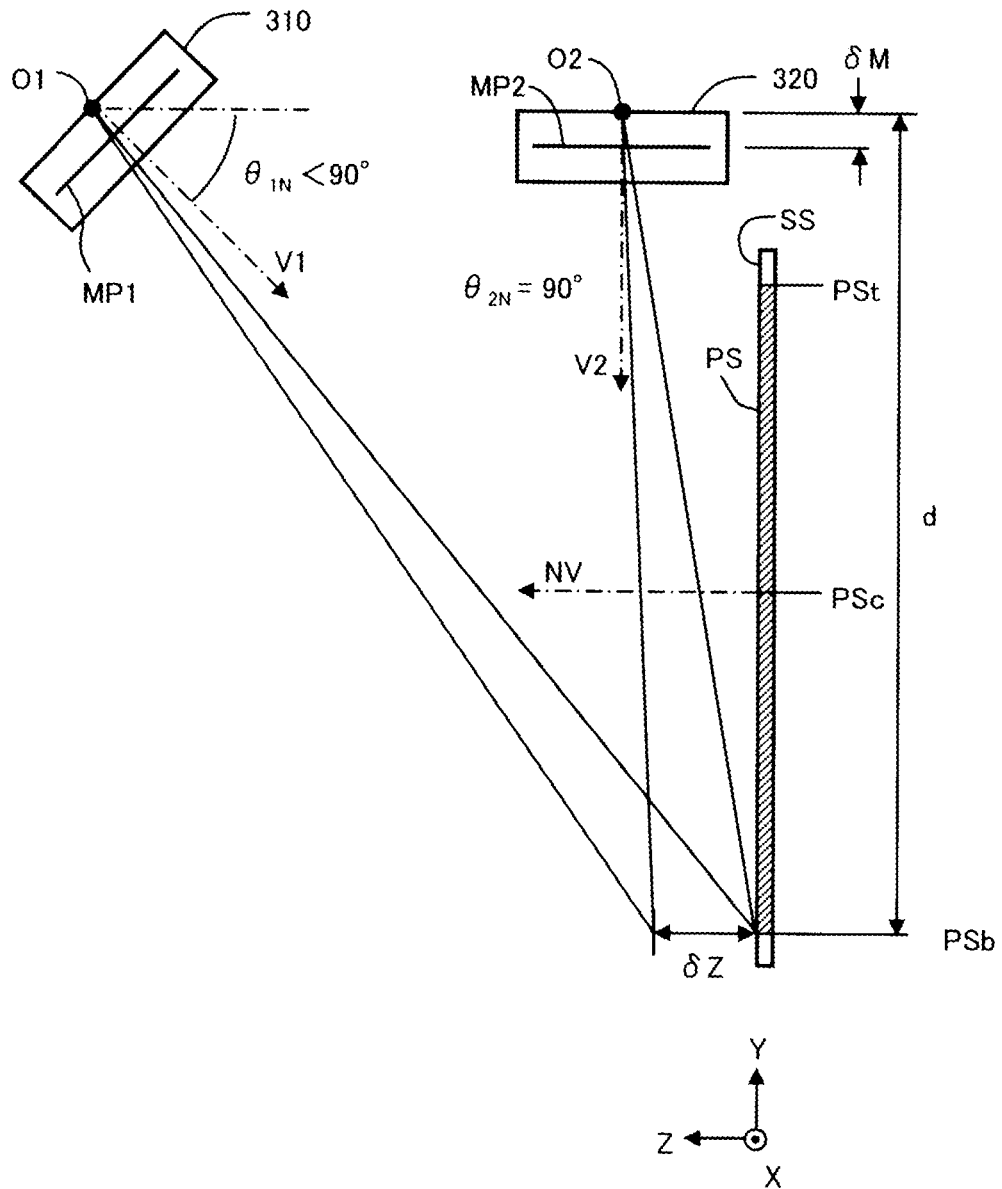
FIG. 6 is an explanatory diagram showing comparison between resolution of Z coordinates in the two cameras ins FIGS. 5A to 5C.

FIG. 6 is an explanatory diagram showing comparison between resolution of the Z coordinates in the two cameras 310, 320 in FIGS. 5A to 5C. In FIG. 6, the non-emitting pointing element 80 that is drawn in FIG. 5A is omitted. In this example, the following formulae hold with respect to sizes L1, L2 of the images at the distance δZ in the two cameras 310, 320.

$$L1 < L2 \quad (3a)$$

$$L2 = (\delta Z \cdot \delta M / d) \quad (3b)$$

where δM is the distances between the image surfaces MP1, MP2 and the camera reference positions O1, O2 in the respective cameras, and d is the distances in the Y direction between the camera reference positions O1, O2 and the lower end PSb of the projected screen PS. Here, it is assumed that the value of δM with respect to the two cameras 310, 320 are equal. Further, it is assumed that the Y coordinates of the camera reference positions O1, O2 of the two cameras 310, 320 are equal.

As expressed in the formula (3a), the size L2 of the image of the distance δZ in the second camera 320 is larger than the size L1 of the image of the distance δZ in the first camera 320, and accordingly, the resolution of the Z coordinate is higher in the second camera 320 than in the first camera 310. The reason is as follows. That is, in the second camera 320, the optical axis V2 is nearly orthogonal to the normal NV of the projected screen PS and the image surface MP 2 is in parallel to the normal NV of the projected screen PS, and thus, the image of the distance δZ along the direction of the normal NV is relatively larger. On the other hand, the optical axis V1 of the first camera 310 is tilted from the normal NV of the projected screen PS by the angle $\theta_{1N}$ ($0 < \theta_{1N} < 90°$) and the image surface MP1 is also tilted from the normal NV of the projected screen PS, and thus, the image of the distance δZ along the normal NV is smaller.

As described above, the angle $\theta_{2N}$ formed by the optical axis vector V2 of the second camera 320 and the projected-screen normal vector NV is set to the value closer to 90° than the angle $\theta_{1N}$ formed by the optical axis vector V1 of the first camera 310 and the projected-screen normal vector NV, and thereby, the resolution of the Z coordinate of the second camera 320 may be made higher than that of the first camera 310. This is restated as follows using the representation of the inner products of the vectors explained in FIG. 5A. That is, the absolute value of the inner product of the optical axis vector V2 of the second camera 320 and the projected-screen normal vector NV|V2·NV| is made smaller than the absolute value of the inner product of the optical axis vector V1 of the first camera 310 and the projected-screen normal vector NV|V1·NV|, and thereby, the resolution of the Z coordinate of the second camera 320 may be made higher than that of the first camera 310. The relationship is estimated to hold in other cases than the angles $\theta_{1N}$, $\theta_{2N}$ shown in FIGS. 5A to 6.

Note that, as is understood from the formula (3b), regarding the second camera 320, as the distance d along the Y direction between the camera reference position O2 and the lower end PSb of the projected screen PS is smaller, the size L2 of the image of the distance δZ is larger, and thus, the resolution of the Z coordinate is higher at the smaller distance d. Therefore, if the second camera 320 is placed to be lower along the Y direction than the first camera 310, the resolution of the Z coordinate of the second camera 320 is made even higher. More specifically, it is preferable that the second camera 320 is placed in the position at the distance measured from the center PSc of the projected screen PS in the direction perpendicular to the direction of the normal NV of the projected screen PS (Y direction) smaller than that of the first camera 310. According to the configuration, the resolution of the Z coordinate of the second camera 320 is even higher, and the detection accuracy of the Z coordinate obtained by triangulation utilizing the images of the two cameras 310, 320 is also improved.

Further, as the angle $\theta_{2N}$ formed by the optical axis vector V2 of the second camera 320 and the normal vector NV of the projected-screen PS is closer to 90°, the higher resolution of the Z coordinate is expected. For example, it is preferable to set the angle $\theta_{2N}$ formed by the optical axis vector V2 of the second camera 320 and the normal vector NV of the projected-screen PS in a range of 90°±10°. In this manner, the detection accuracy of the Z coordinate is further improved.

As described above, in the embodiment, the two cameras 310, 320 are arranged so that the absolute value of the inner product of the optical axis vector V2 of the second camera 320 and the projected-screen normal vector NV|V2·NV| may be smaller than the absolute value of the inner product of the first optical axis vector V1 of the first camera 310 and the projected-screen normal vector NV|V1·NV|, and the resolution of the Z coordinate in the second camera 320 is made higher. As a result, compared to the case where the optical axis V2 of the second camera 320 is oriented in the same direction as the optical axis V1 of the first camera 310, the detection accuracy of the Z coordinate of the tip part of the pointing element may be improved.

Note that in the arrangement of the cameras 310, 320 as shown in FIGS. 5A to 6, the resolution of the Z coordinate of the second camera 320 is higher than that of the first camera 310, however, the resolution of the Y coordinate of the first camera 310 is higher than that of the second camera 320. Further, the resolution of the X coordinate of the two cameras 310, 320 is equal. In consideration of the points, it may be understood that the two cameras 310, 320 are arranged so that the optical axis vectors V1, V2 of the two cameras 310, 320 form different angles with the projected-screen normal vector NV, and thereby, both the resolution of the Z coordinate and the resolution of the Y coordinate can be made higher.

Note that, in the embodiment explained in the FIGS. 4A to 6, the two cameras 310, 320 are set in the same coordinate position with respect to the X direction (the direction along the lateral directions of the projected screen PS), however, they may be arranged in different coordinate positions with respect to the X direction. Also, in this case, the relationships explained in FIGS. 5A to 6 similarly hold.

C. Preferred Arrangement and Orientation of Cameras (Part 2)

Figure 7:
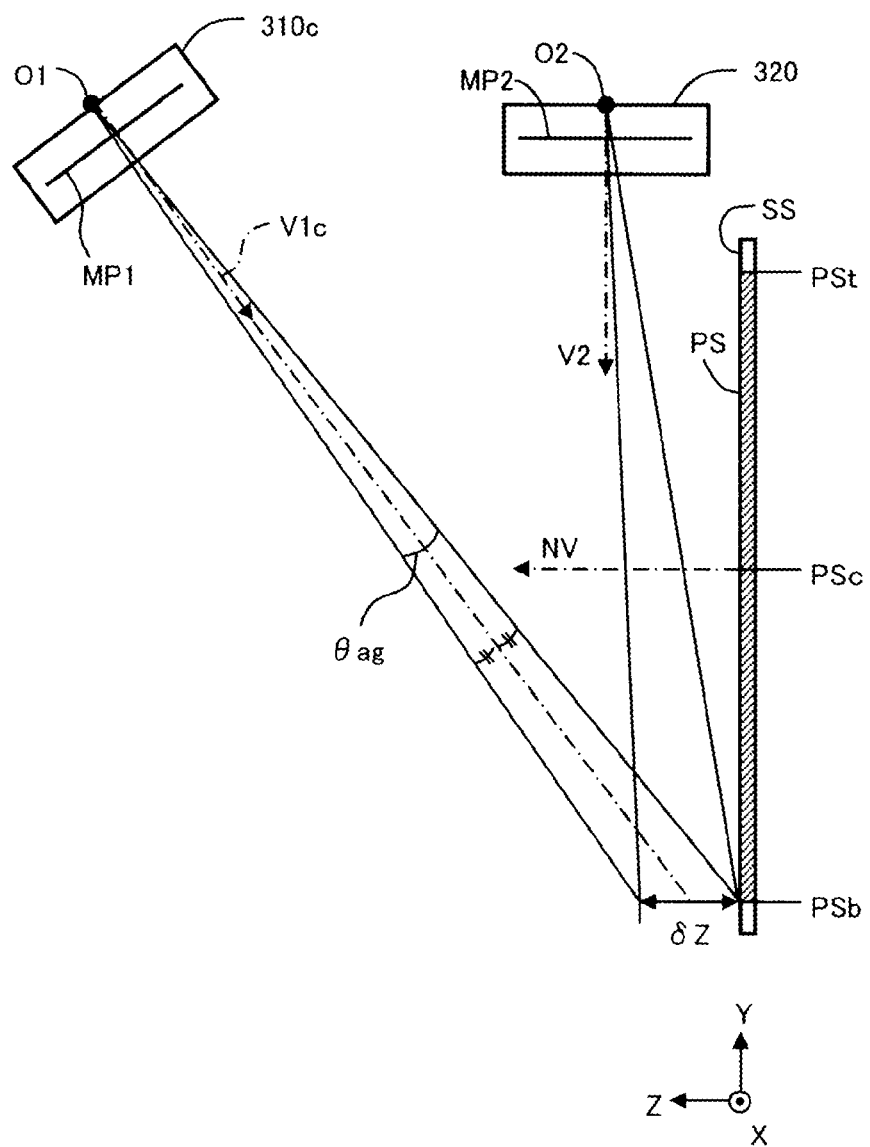
FIG. 7 is an explanatory diagram showing an arrangement example of a first camera with lower resolution of the Z coordinate.

FIG. 7 shows an arrangement example of a first camera 310c with lower resolution of the Z coordinate than that in FIG. 6. This drawing shows that the first camera 310 in FIG. 6 is rotated around the camera reference position O1 so that an optical axis V1c of the first camera 310c may pass through the center of the distance δZ. The arrangement and the orientation of the second camera 320 are the same as those in FIG. 6. If the case where the first camera 310c is oriented in various directions around the camera reference position O1 is assumed, an angle $\theta_{ag}$ at which the distance δZ is seen from the camera reference position O1 is unchanged. In this regard, the size of the image of the distance δZ in the first camera 310c is the minimum in the case where the orientation of the first camera 310c is set so that the optical axis V1c may pass through the center of the distance δZ as shown in FIG. 7. This is because, in the state of FIG. 7, the size of an image surface MP1 of the first camera 310c cut by the angle $\theta_{ag}$ at which the distance δZ is seen (i.e., the size of the image of the distance δZ) is the minimum.

However, the detection accuracy of the distance δZ is actually problematic in the case where the tip part 81 of the non-emitting pointing element 80 (FIGS. 4A and 4B) is sufficiently closer to the projected screen PS, e.g., the case where the distance δZ is equal to or less than 10 mm. Therefore, it may be considered that the resolution of the Z coordinate of the first camera 310c is the minimum in the case where the orientation of the first camera 310c is set so that the line as extension of the optical axis V1c may pass through the lower end PSb of the projected screen PS. In consideration of the point, regarding the first camera 310 shown in FIGS. 5A to 6, it is preferable that the angle formed by the line connecting the camera reference position O1 and the lower end PSb of the projected screen PS and the optical axis V1 is larger because the resolution of the Z coordinate is higher. The same applies to the second camera 320.

Figure 8:
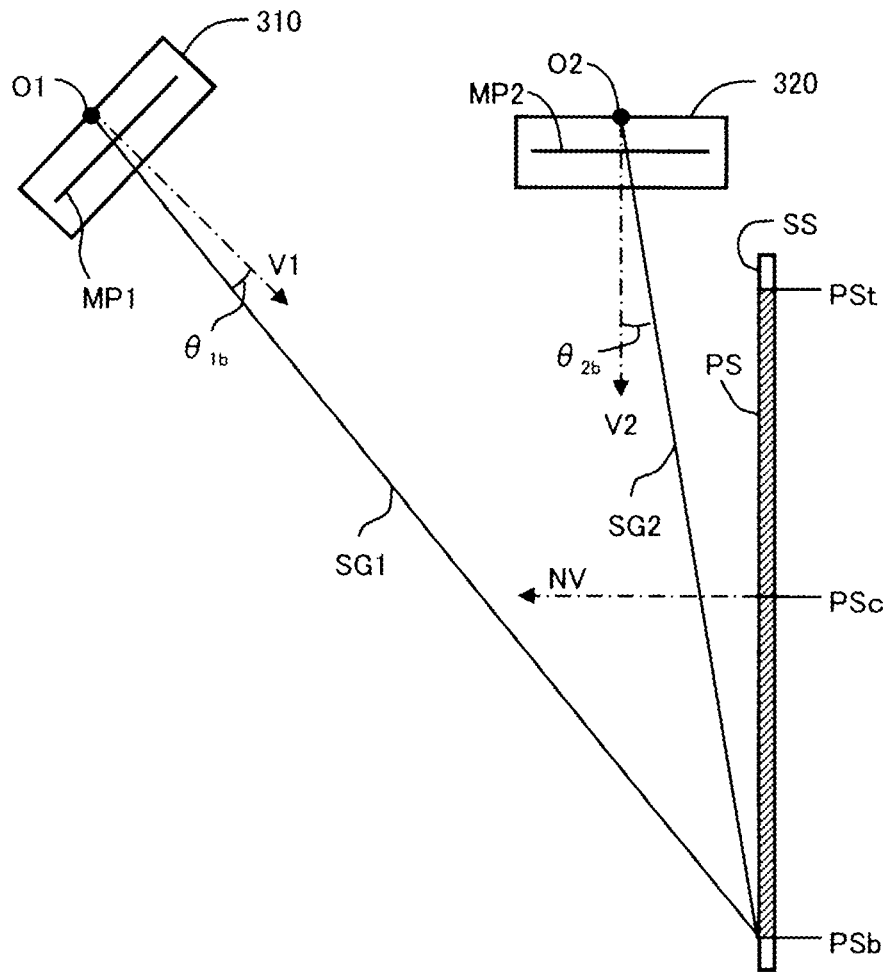
FIG. 8 is an explanatory diagram showing comparison between resolution of Z coordinates in the two cameras in FIGS. 5A to 5C.

FIG. 8 shows angles $\theta_{1b}$, $\theta_{2b}$ formed by lines SG1, SG2 connecting the camera reference positions O1, O2 and the lower end PSb of the projected screen PS and the optical axes V1, V2 with respect to the two cameras 310, 320 shown in FIGS. 5A to 6. In this example, the following formula holds.

$$\theta_{1b} < \theta_{2b} \quad (4)$$

It is preferable to arrange the two cameras 310, 320 so that the relationship of the formula (4) may hold because the resolution of the Z coordinate of the second camera 320 may be made higher. Note that the first camera 310 is located in the position farther than the second camera 320 from the lower end PSb of the projected screen PS, and thus, even when the angles $\theta_{1b}$, $\theta_{2b}$ in FIG. 8 with respect to the two cameras 310, 320 are equal to each other, the resolution of the Z coordinate of the second camera 320 is higher than that of the first camera 310. However, the two cameras 310, 320 are arranged so that the angle $\theta_{2b}$ of the second camera 320 may be made larger than the angle $\theta_{1b}$ of the first camera 310, and thereby, the resolution of the Z coordinate of the second camera 320 may be made even higher than that of the first camera 310, and the detection accuracy of the Z coordinate using the two cameras 310, 320 may be further improved.

D. Another Arrangement Example of Cameras

FIGS. 9A to 9C are explanatory diagrams showing arrangement of two cameras 310, 320 in another embodiment. FIGS. 9A and 9B correspond to FIGS. 2A and 2B, however, differ from FIGS. 2A and 2B in the position of the second camera 320. That is, in the example of FIGS. 9A and 9B, the position of the second camera 320 has the same YZ coordinates as the first camera 310 and differs only in the X coordinate. In FIG. 9A, the second camera 320 is behind the projection lens 210 and the illustration is omitted.

FIG. 9C shows the camera reference positions O1, O2 and the optical axis vectors V1, V2 of the two cameras 310, 320. FIG. 9C shows the state in which the two cameras 310, 320 are seen along the X direction and the reference positions O1, O2 of the two cameras 310, 320 overlap. Further, the directions of the optical axis vectors V1, V2 of the two cameras 310, 320 are the same as those described above in FIGS. 5A to 6. According to the configuration, even when the YZ coordinates of the two cameras 310, 320 are set in the same position, the relationship explained in FIGS. 5A to 6 still holds, and thus, the detection accuracy of the Z coordinate can be improved. Note that, in the example of FIGS. 9A to 9C, to enable the second camera 320 to capture the whole projected screen PS, the angle of view of the second camera 320 is larger than that in the case of FIGS. 5A to 5C. In consideration of this point, as in the example of FIGS. 5A to 6, it is preferable to arrange the second camera 320 in the position in which the perpendicular distance of the second camera 320 from the projected screen PS is smaller than that of the first camera 310.

MODIFIED EXAMPLES

The invention is not limited to the above-described examples and embodiments, but may be implemented in various forms without departing from the scope thereof. For example, the following modifications may be made.

Modified Example 1

In the embodiments, the capture unit 300 has the two cameras 310, 320, however, the capture unit 300 may have three or more cameras. In the latter case, three-dimensional coordinates (X, Y, Z) are determined based on m (m is an integer number equal to or more than three) images captured by m cameras. For example, three-dimensional coordinates may be respectively obtained using $_mC_2$ combinations obtained by arbitrary selection of two images from the m images, and the final three-dimensional coordinates may be determined using average values of them. In this manner, the detection accuracy of the three-dimensional coordinates can be further improved.

Modified Example 2

In the embodiments, the interactive projection system 900 is operable in the whiteboard mode and the PC interactive mode, however, the system may be adapted to operate only in one mode of them. Further, the interactive projection system 900 may be adapted to operate only in another mode than those two modes, and further, may be adapted to operate in a plurality of modes including the two modes.

Modified Example 3

In the embodiments, all of the applied detection light IDL, the reflected detection light RDL, the apparatus signal light ASL, and the pointing element signal light PSL are near-infrared light, however, part or all of them may be other light than near-infrared light.

Modified Example 4

In the embodiments, the projected screen is projected on the screen board 920 having a plane shape. However, the projected screen may be projected on a screen having a curved shape. In this case, since the three-dimensional position of the tip part of the pointing element can also be determined utilizing triangulation using the images captured by the two cameras, the positional relationship between the tip part of the pointing element and the projected screen can be determined.

As above, the embodiments of the invention are explained based on some examples, however, the embodiments of the invention are to facilitate the understanding of the invention not for limiting the invention. The invention may be changed and altered without departing from the scope thereof and the appended claims, and the invention obviously includes the equivalents.

What is claimed is:

1. An interactive projector capable of receiving an instruction to a projected screen by a user with a pointing element, comprising:
   a projection section adapted to project the projected screen on a screen surface;
   a plurality of cameras including a first camera and a second camera adapted to capture images of an area of the projected screen; and
   a position detection section adapted to detect a three-dimensional position of the pointing element based on the images captured by the plurality of cameras,
   wherein a unit vector representing a normal direction of the projected screen is defined as a projected-screen normal vector, a unit vector representing a direction of an optical axis of the first camera is defined as a first optical axis vector, and a unit vector representing a direction of an optical axis of the second camera is defined as a second optical axis vector,
   the first camera and the second camera are arranged such that an absolute value of an inner product of the second optical axis vector and the projected-screen normal vector is smaller than an absolute value of an inner product of the first optical axis vector and the projected-screen normal vector.

2. The interactive projector according to claim 1, wherein two directions intersecting with each other on the projected screen are defined as X direction and Y direction where +Y direction is called an upper direction while −Y direction is called a lower direction, the projected screen is projected on a lower side of the interactive projector, another direction orthogonal to the X direction and the Y direction is defined as Z direction,
   an intersection point of a lower side edge of the projected screen and a first Y-Z plane is defined as a first intersection point where the lower side edge is a lower one of two side edges of the projected screen opposing with each other in the Y direction, and the first Y-Z plane passes a lens center of the first camera; and an angle between the optical axis of the first camera and a segment line passing the lens center of the first camera and the first intersection point is defined as a first angle,
   an intersection point of the lower side edge of the projected screen and a second Y-Z plane is defined as a second intersection point where the second Y-Z plane passes a lens center of the second camera; and an angle between the optical axis of the second camera and a segment line passing the lens center of the second camera and the second intersection point is defined as a second angle,
   the first camera and the second camera are arranged such that the second angle is larger than the first angle.

3. The interactive projector according to claim 1, wherein the second camera is arranged such that a vertical distance of the second camera from the projected screen is smaller than a vertical distance of the first camera from the projected screen.

4. The interactive projector according to claim 3, wherein the second camera is arranged such that a distance of the second camera measured in a direction orthogonal to the normal direction of the projected screen is smaller than a distance of the first camera measured in the direction orthogonal to the normal direction of the projected screen.

5. The interactive projector according to claim 1, wherein an angle between the second optical axis vector and the projected-screen normal vector is in a range of 90±10°.

6. An interactive projecting system comprising:
the interactive projector according to claim 1; and
a screen having a screen surface on which the projected screen is projected.

* * * * *